2,803,234

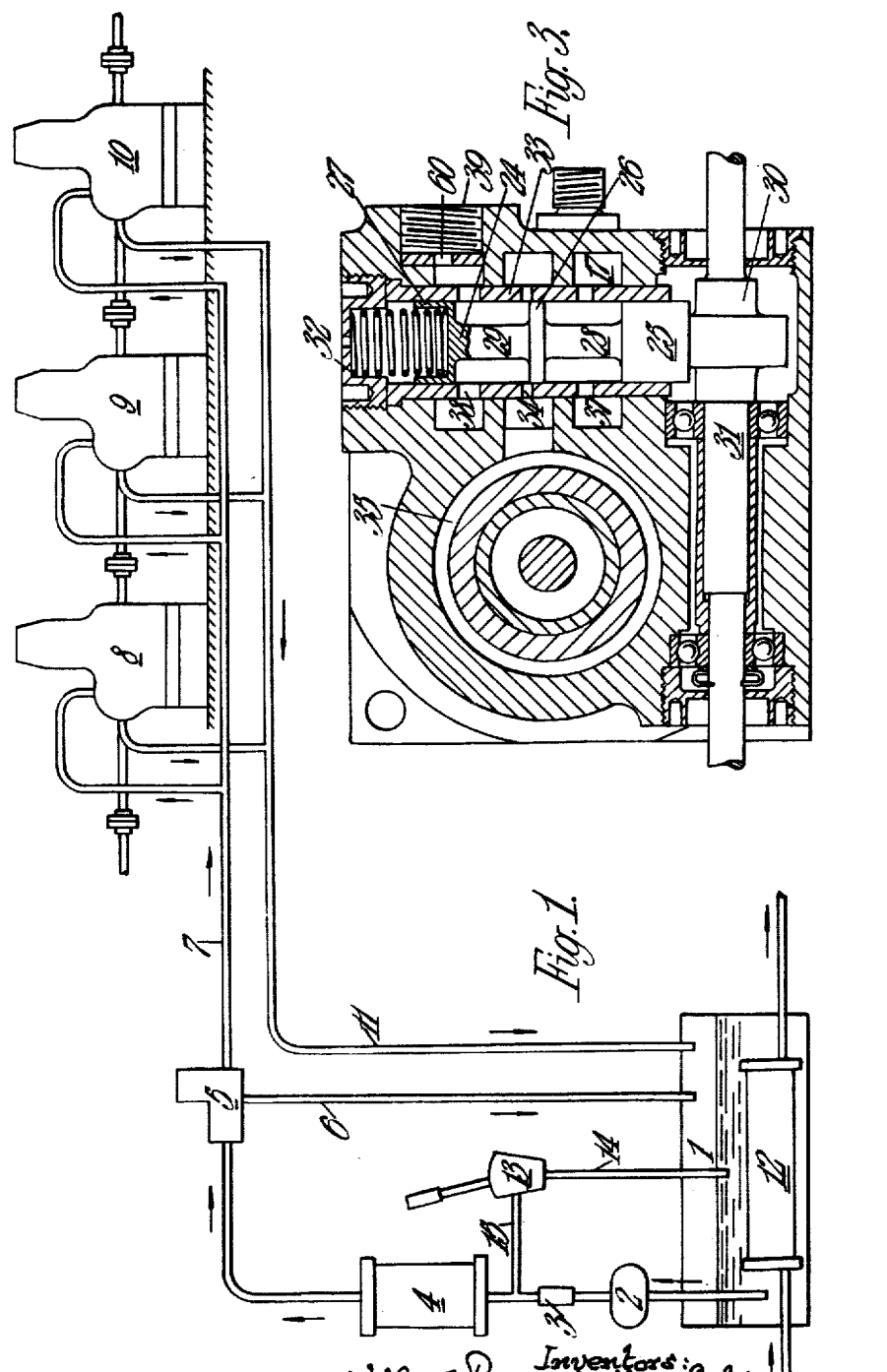

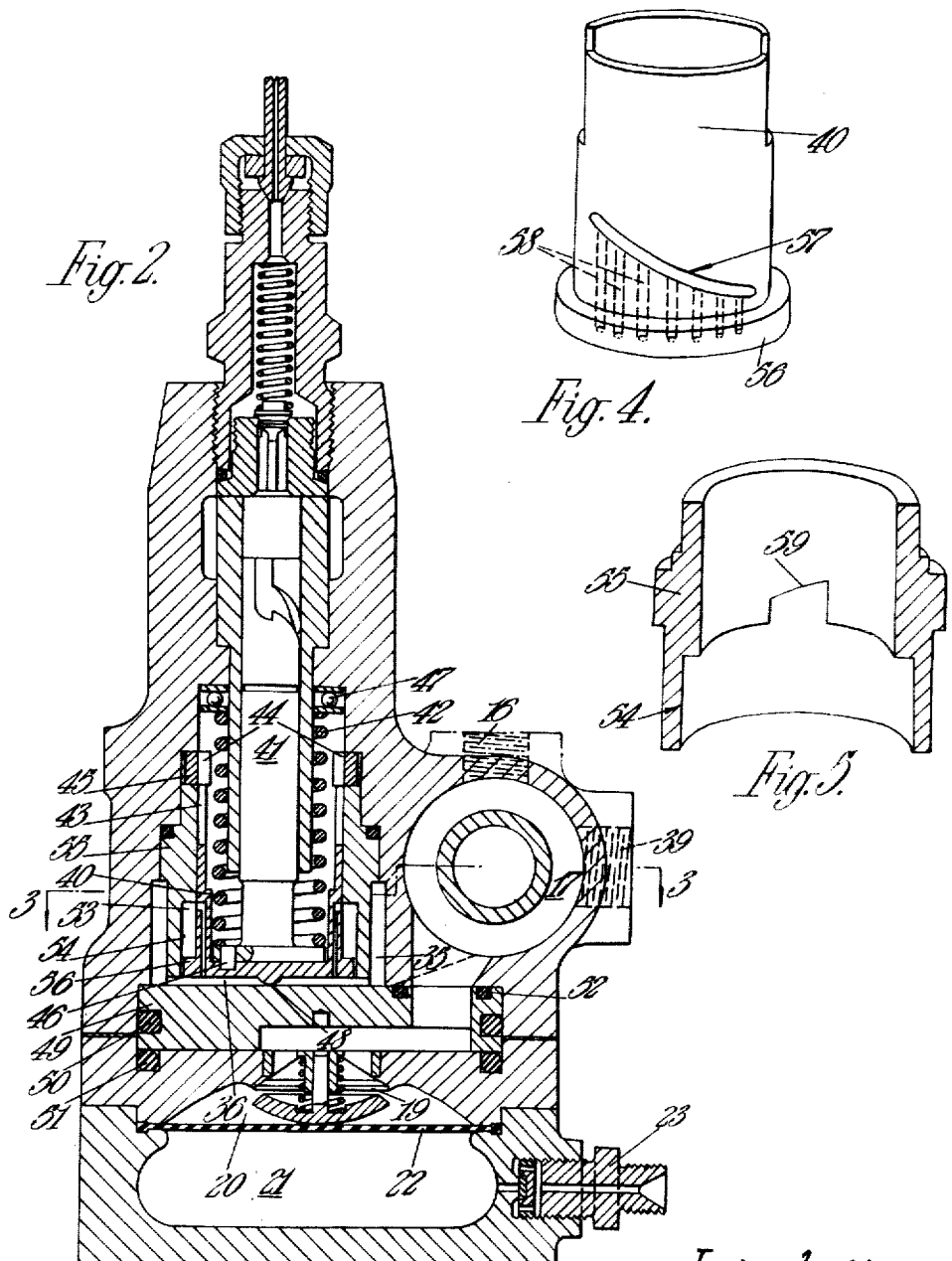

LIQUID FUEL INJECTION SYSTEMS FOR INTERNAL COMBUSTION ENGINES

Wilfred Percival Mansfield and Ludwig Rosenfeld, Slough, England, assignors, by mesne assignments, to The British International Combustion Engine Research Association, Slough, England Application November 24, 1953, Serial No. 394,148

Claims priority, application Great Britain November 24, 1952

5 Claims. (Cl. 123—139)

This invention relates to liquid fuel injection systems for compression ignition internal combustion engines and in particular to operating means for plunger pumps of the jerk type.

In an early form of system for injecting fuel into the cylinders of compression-ignition engines, known as the "common-rail" system, a pump is used to pump the fuel at a high pressure (e. g. 6000 p. s. i.) into a reservoir connected to a manifold from which the fuel passes to the individual cylinders, the commencement and end of the injection being controlled by mechanically operated valves in the injectors. This system suffers from the defect among others that if one of the injection valves fails to close, an excess of fuel enters the cylinder, or with imperfect sealing dribble occurs.

In a further system known as the "jerk pump system," a separate mechanically operated pump is provided for each cylinder, the injector in this case having a nozzle with a spring-loaded valve or an open nozzle. This system is simpler in that the injection period is controlled by the pump itself. In the event of the nozzle valve failing to close, the amount of fuel entering the cylinder per cycle is not greatly affected.

The use of the jerk pump system however, presents certain difficulties in the case of the larger sizes of compression-ignition engine, or in smaller sized engines which are pressure-charged to high brake mean effective pressures, above 200 p. s. i. for example. An important limitation of the jerk pump system is that the whole of the work required for the compression and discharge of the fuel on each cycle must be taken from the pump driving shaft during a time interval which is even shorter than the actual period of injection of fuel into the engine cylinder, and normally amounts to about 10 degrees of pump shaft rotation. All the parts driving the pump plunger must accordingly be designed to withstand a very high load for about 10 degrees of shaft rotation (and moreover a load which is applied very suddenly) while for most of the remaining 350 degrees or so of rotation the system has a negligible amount of work to do. Thus in the types of engine referred to, the sizes of the pump camshaft (and associated tappets, levers, etc.) coupling, drive shaft and driving gears or chain, become excessively large and heavy. A further defect of the jerk pump system is that approximately one third only of the full stroke of the pump can be used satisfactorily for pumping fuel, the first third of the stroke being used for acceleration and the last third for deceleration of the plunger and other reciprocating parts.

The object of the present invention, therefore, is to provide a system in which these defects of the jerk pump system are avoided while retaining the desirable features of the system, notably the good injection characteristics, and ease of control, and in which the defects of the common-rail system, viz. dribble or excessive injection in the event of a nozzle needle failing to close, are avoided.

The invention consists in an operating system for fuel injection self-metering pump means for an internal combustion engine comprising an accumulator for containing an operating liquid under pressure against gas pressure, a reservoir for said operating liquid, a supply pump for supplying and maintaining said operating liquid at any sufficient pressure above a predetermined minimum operating pressure in said accumulator, injection pump means, pressure liquid operating means for operating the injection pump means, and controlling means for permitting the supply of said operating liquid under pressure from said accumulator to the pump operating means cyclically in timed relationship with the engine cycle during a comparatively short period of each cycle.

The improved system is chiefly intended for use with jerk pumps, and the preferred type is the commonly used jerk type pump in which the control of discharge quantity is effected by rotation of the plunger, which has a helical edge associated with a port. Except for the very light valve operating mechanism, no camshaft or follower of any type is used, and the normal tappet and guide piston are replaced by a simple piston which may be of about the same size as the normal guide piston and may occupy the same position in relation to the injection pump plunger. A dashpot is arranged to bring the piston rapidly to rest without shock at the end of its effective stroke. The pump plunger is operated by the admission of a fluid to the cylindrical chamber housing the piston. The pumping and return stroke of the plunger may be effected by the admission of fluid alternatively to the two sides of the piston or fluid may be admitted to one side only, effecting the pumping stroke, the return stroke being effected by a spring.

The fluid, which will be termed the "servo-liquid" and which may be fuel oil or alternatively a liquid specially suited to the purpose, is supplied to the piston chamber at a pressure which is a fraction of the maximum pressure required in the injection pipe. Thus, if the maximum injection pressure required is 8000 p. s. i., the servo-liquid pressure may be 1000 p. s. i., for example, the piston area being in this case approximately eight times that of the pump plunger.

Admission of the servo-liquid to the piston chamber and its subsequent release from the chamber are controlled by a light mechanically-operated valve giving a rate of opening such that the piston, and with it the pump plunger, is accelerated rapidly, but without shock. The preferred arrangement is a pressure-balanced piston-type valve which is moved axially by a cam against a light return spring, and which places the piston chamber in communication via ports first with the servo-liquid supply system and later with a servo-liquid return pipe.

The servo-liquid is compressed and passed under pressure to an accumulator by means of a supply pump which absorbs power continuously or substantially continuously. The pump may be arranged in any convenient position, the length of the pipe leading from the supply pump to the reservoir being unimportant. It will frequently be most convenient to drive a small high-speed pump from a pinion forming part of the gear system commonly used to drive water pumps, lubricating oil pumps, and the camshaft operating the inlet and exhaust valves.

The accumulator which receives fluid from the supply pump and passes it to the individual piston chambers is preferably of the type in which a quantity of gas of the servo-liquid pressure is trapped in a chamber separated from that through which the servo-liquid passes, by a piston or diaphragm. Compression and expansion of the gas accommodates the sudden changes in the volume of servo-liquid in the reservoir, without large changes in pressure.

The servo-liquid supply pump may be of a variable delivery type and controlled to give a small delivery when the engine is running at part load, and only the first portion of the injection pump plunger movement is effective. In combination with this the movement of the piston or diaphragm in the servo-liquid accumulator may be limited so that on each cycle the reservoir discharges only the amount of fluid supplied by the pump during the corresponding period, and the gas pressure falls only to a predetermined value. By these means the power absorbed by the servo-liquid pump at part engine loads is reduced. Again, in order to minimise the power required, the amount of gas trapped in the accumulator may be limited so that the pressure falls as much as is possible without adversely affecting the injection condition.

The accompanying drawings show, by way of example only, one embodiment of the invention in which:

Figure 1 shows a general arrangement of the system,

Figure 2 shows a vertical cross-section of one of the units of Figure 1,

Figure 3 shows a horizontal cross-section on the line 3—3 of Figure 2,

Figures 4 and 5 are perspective views of parts forming a dashpot,

Figure 6:
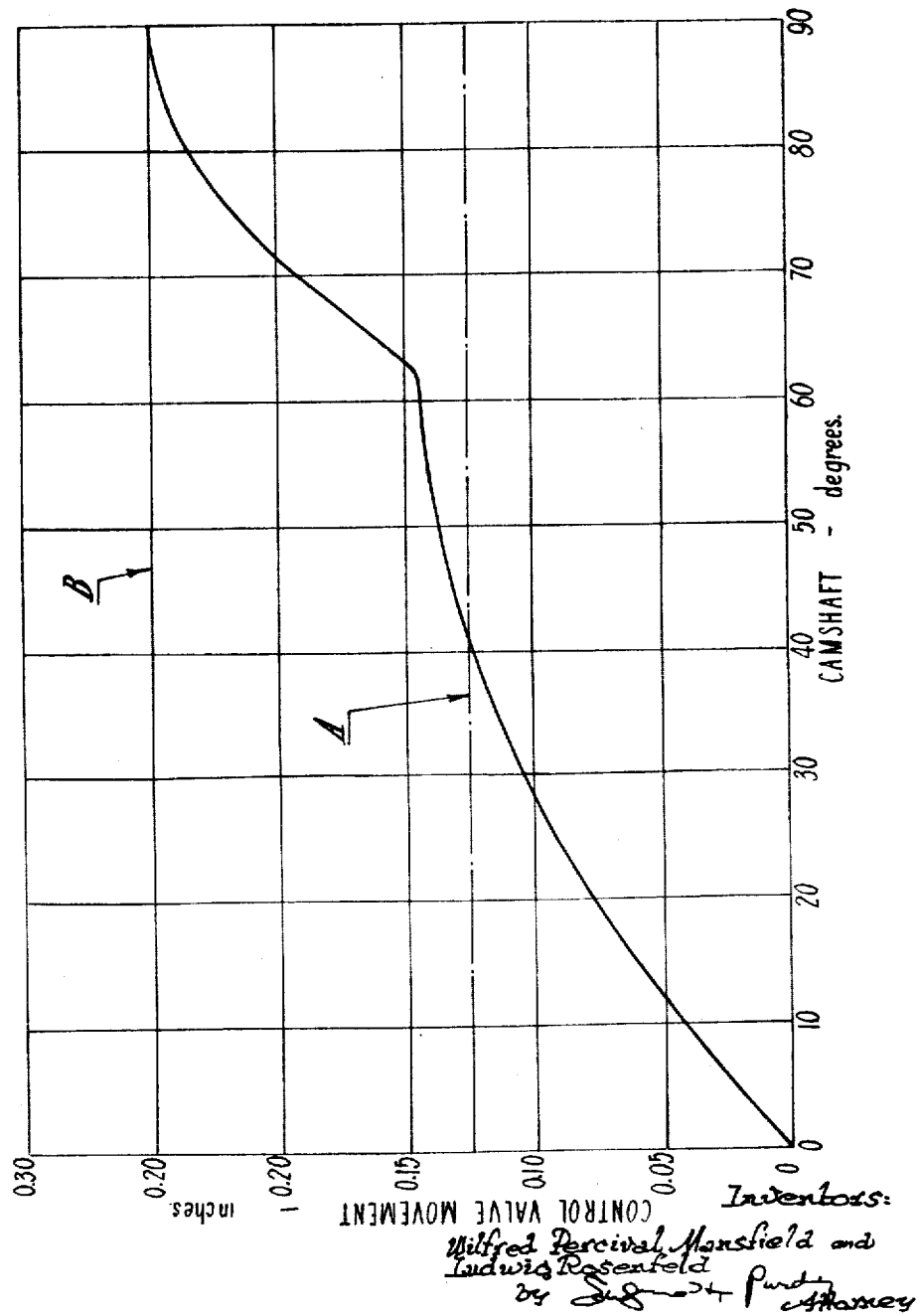
Figure 6 is a graph showing the control valve movement relative to camshaft rotation.

Referring to Figure 1 servo-liquid is drawn from a reservoir 1 by a gear type pump 2 driven continuously by the engine, and passed at a pressure of the order of 1000 p. s. i. g. (pounds per square inch gauge) via a non-return valve 3 and a filter 4 to a relief valve 5 which limits the pressure to the chosen value, excess liquid being returned to the reservoir via the pipe 6. The remainder of the servo-liquid passes via the pipe 7, to the individual injection pump operating units, three of which, 8, 9 and 10 are shown by way of example. The servo-liquid discharged after use is returned to the reservoir by the pipe 11. The servo-liquid is cooled by a heat-exchanger 12 which is conveniently arranged in the reservoir, and is supplied with cooling water. A hand operated pump 13 is provided for pumping servo-liquid from the reservoir into the system via the pipes 14 and 15 for priming the system and for checking the operation of the pumps. When this pump is used, the non-return valve 3 prevents the leakage of liquid back to the reservoir via the gear-type pump 2.

Referring now to Figure 2, the servo-liquid enters at a connection 16 and flows during a large part of the cycle via the annular space 17 (Figures 2 and 3), the passage 28 (Figure 2) and the valve 19 into the accumulator space 20, compressing air in the space 21, the servo-liquid and the air being separated by the flexible diaphragm 22 which may be made of synthetic rubber. The space 21 below the diaphragm is initially charged with air or other suitable gas via the valve 23 to a pressure somewhat below the selected servo-liquid mean operating pressure (e. g. 850 p. s. i. g. when the servo-liquid mean operating pressure is 1000 p. s. i. g.). When the system is at rest, and the servo-liquid pressure is zero, the valve 19 is closed, and the diaphragm 22 rests against the smooth continuous surface formed by the wall of the chamber 20 and the valve head. When the gear pump operates, the valve 19 opens and servo-liquid enters the space 20 raising the air pressure to the servo-liquid pressure. During operation, the cyclic demand for servo-liquid from the accumulator space 20 and the subsequent re-charging of this space cause a movement of the diaphragm 22 to the two sides of the position shown.

The mechanically operated valve 24 (Figure 3), which controls the flow of servo-liquid, comprises three piston-like-cylindrical portions 25, 26 and 27 connected by two cylindrical portions 28 and 29 of smaller diameter. This valve is moved in one direction by a cam 30 on a shaft 31 which is mechanically driven by the engine, and return motion of the valve is effected by a spring 32. The valve moves in a sleeve 33 provided with three sets of ports, namely, central ports 34 communicating via the annular space 35 with the space 36 (Figure 2) below the plunger operating piston, outer ports 37 communicating with the accumulator space 20, and outer ports 38 communicating with the discharge pipe connection 39.

In the position shown in Figure 2, the valve 24 places the space 36 below the plunger operating piston in communication with the discharge pipe via the ports 34 and 38, and the pump plunger assembly is at the lower end of its stroke. As the valve 24 is moved away from the camshaft 31 by the cam 30, the central cylindrical portion 26 moves across the central port 34 placing the space 36 below the plunger operating piston in communication via the ports 34 and 37 with the accumulator space 20 and the servo-liquid supply pipe. The servo-liquid pressure acts on the plunger operating piston 40 (Figure 2) which carries inside it the pump plunger 41 which is held against the piston 40 by the return spring 42.

The plunger operating piston is provided with two vertical slots 43 which are engaged by inward projections 44 on a toothed ring 45. The teeth on this ring are engaged by a rack in the conventional manner. Movement of the rack rotates the plunger operating piston 40 and with it the pump plunger 41, relative rotary movement of these parts being prevented by the dowel 46. The spring 42 also rotates with this assembly, a ball thrust bearing 47 being provided to reduce friction. In the position shown, a central projection 48 on the underside of the plunger operating pistons rests on the plate 49 and acts as a pivot about which the plunger operating piston may be rotated without serious resistance. The plate 49 serves to separate the various chambers and passages in the assembly and is provided with suitable seals 50, 51 and 52, which may be in the form of rings of synthetic rubber.

A dashpot chamber 53 is formed between a counterbore 54 defining a fluid chamber in the hydraulic cylinder 55, in which the plunger operating piston works, and the plunger operating piston 40 which is provided with a flange 56. A small clearance is provided between this flange and the counterbore to permit escape of servo-liquid at a suitable rate from the dashpot. Spill ports 57 and discharge passages 58 are arranged in the wall of the plunger operating piston to permit the free discharge of servo-liquid from the dashpot during the effective portion of the pump plunger stroke.

One of the spill ports 57 and its discharge passages 58 in the plunger operating piston 40 are shown also in Figure 4 and the counterbore 54 in the cylinder 55 is shown also in Figure 5.

A helical or otherwise sloping control surface 59 (Figure 5) is provided at each of two opposite sides of the cylinder 55 beyond the end of the counterbore 54.

The edges of the ports 57 (Figure 4) are similarly shaped so that at a certain point in the travel of the plunger, the lower edges of the ports 57 coincide with the control edges 59 at the end of the counterbore, whereupon free discharge from the dashpot ceases and the dashpot becomes effective. By virtue of the slope of the control edges, the point in the plunger travel at which this occurs changes as the plunger and piston assembly is rotated by movement of the control rack. The relative positions of the control edges and the helix angle are such that the dashpot spill ports are closed at any rack setting shortly after the port control edge of the pump plunger 41 has uncovered the pump spill port (not shown). The pump plunger assembly thus performs the effective part of its stroke at full velocity and is then brought smoothly to rest.

When the valve 24 places the space 36 below the plunger operating piston in communication with the discharge pipe and the pump plunger assembly makes its return stroke under the action of the return spring, the dashpot chamber is refilled, towards the end of the return stroke, with servo-liquid from the space 36 via the passages 58 and ports 57. The velocity with which the pump plunger assembly returns is suitably limited by the use of a flow restricting orifice 60 in the discharge pipe connection 39 (Figure 3). The acceleration of the assembly at the commencement of its forward movement is limited by limiting the rate at which the port 34 is uncovered by the portion 26 of the valve 24, the contour of the cam 30 being designed to produce the valve movement shown in Figure 6 in which A is where the inlet port begins to open and B is where the inlet port is fully open.

It therefore can be seen, in the preferred embodiment of the invention, broadly speaking the system comprises a continuously loaded pump supplying servo-liquid at moderate pressure to an accumulator, having a gas cushion, which in turn supplies the servo-liquid via a balanced pressure piston valve, cam-operated against a light return spring, to a chamber containing a piston on which the servo-liquid pressure acts and which in turn drives the injection pump plunger on its discharge stroke, the piston being arrested at the end of its effective stroke by a dashpot, and returned by a spring.

Tests of a system arranged in accordance with the invention have shown that the desired effects are realised. The pump plunger is rapidly accelerated at the beginning of its stroke, and rapidly decelerated when the piston enters the dashpot at the end of the stroke. As a result of the high velocity attained, the injection rate is approximately twice that obtainable with the steepest practicable cam in a mechanically operated pump having the same diameter plunger. The output of the pump is greatly increased by the increase in the effective portion of the plunger stroke. The mechanical drive to the cams operating the balanced pressure piston type control valve is extremely light, and may include a device of known type for varying the timing of injection, whereas such devices have been found unsatisfactory when large and suddenly changing torques have to be transmitted.

The invention is suitable for use with combined fuel pumps and injectors in that no heavily loaded drive shafts are necessary adjacent the combined pump and ejector. It is to be understood that the aforegoing description is by way of example only and details for carrying the invention into effect may be varied without departing from the scope of the invention.

We claim:

1. Liquid fuel injection system for an internal combustion engine comprising storage means for liquid, a delivery pump for delivering liquid under pressure from said storage means, accumulator means for receiving the pressure liquid from said pump comprising an expansible and contractible sealed vessel containing a gaseous medium at a pressure which is relatively constant but varies with the quantity of fuel injected by the system and independent of all other operations of the engine, liquid pressure operated injection pump means having plunger means and dashpot means associated therewith adapted to bring the plunger means smoothly to rest at the end of the delivery stroke and a helix upon the dashpot means for varying the point in the delivery stroke at which the dashpot action commences, said pump means being located closely adjacent to and connected with said accumulator means and adapted to meter the quantity of fuel delivered at each stroke thereof, liquid flow control means between said injection pump means and said accumulator means for controlling the supply of pressure liquid to the injection pump means comprising a cylinder, a discharge pipe, port means in the walls of the cylinder communicating respectively with the accumulator means, the plunger means and the discharge pipe, and a piston in the cylinder adapted to open and close the ports and place the plunger means in communication alternatively with the accumulator means and the discharge pipe, and operating means for operating the liquid flow control means in timed sequence with the cycle of operation of the engine.

2. Liquid fuel injection system for an internal combustion engine comprising storage means for liquid, a delivery pump for delivering liquid under pressure from said storage means, accumulator means for receiving the pressure liquid from said pump comprising an expansible and contractible sealed vessel containing a gaseous medium at a pressure which is relatively constant but varies with the quantity of fuel injected by the system and independent of all other operations of the engine, liquid pressure operated injection pump means having plunger means and dashpot means associated therewith adapted to bring the plunger means smoothly to rest at the end of the delivery stroke, a helix upon the plunger which upon rotation varies the quantity of fuel injected, a helix upon the dashpot means which upon rotation varies the point in the delivery stroke at which the dashpot action commences and means for rotating them in co-ordination simultaneously, liquid flow control means between said injection pump means and said accumulator means for controlling the supply of pressure liquid to the injection pump means comprising a cylinder, a discharge pipe, port means in the walls of the cylinder communicating respectively with the accumulator means, the plunger means and the discharge pipe, and a piston in the cylinder adapted to open and close the ports and place the plunger means in communication alternatively with the accumulator means and the discharge pipe, and operating means for operating the liquid flow control means in timed sequence with the cycle of operation of the engine.

3. Liquid fuel injection system for an internal combustion engine comprising storage means for liquid, a delivery pump for delivering liquid under pressure from said storage means, accumulator means for receiving the pressure liquid from said pump comprising a sealed vessel defining a chamber containing a gaseous medium which is separated from a chamber containing the said pressure liquid by a diaphragm, the pressure of the gas being relatively constant but varying with the quantity of fuel injected by the system and independent of all other operations of the engine, liquid pressure operated injection pump means having plunger means and dashpot means associated therewith adapted to bring the plunger means smoothly to rest at the end of the delivery stroke and a helix upon the dashpot means for varying the point in the delivery stroke at which the dashpot action commences, said pump means being located closely adjacent to and connected with said accumulator means and adapted to meter the quantity of fuel delivered at each stroke thereof, liquid flow control means between said injection pump means and said accumulator means for controlling the supply of pressure liquid to the injection pump means comprising a cylinder, a discharge pipe, port means in the walls of the cylinder communicating respectively with the accumulator means, the plunger means and the discharge pipe, and a piston in the cylinder adapted to open and close the ports and place the plunger means in communication alternatively with the accumulator means and the discharge pipe, and operating means for operating the liquid flow control means in timed sequence with the cycle of operation of the engine.

4. Liquid fuel injection system for an internal combustion engine comprising storage means for liquid, a delivery pump for delivering liquid under pressure from said storage means, accumulator means for receiving the pressure liquid from said pump comprising a sealed vessel defining a chamber containing a gaseous medium which is separated from a chamber containing the said pressure liquid by a diaphragm, the pressure of the gas being relatively constant but varying with the quantity of fuel injected by the system and independent of all other operations of the engine, liquid pressure operated injection pump means having plunger means and dashpot means associated therewith adapted to bring the plunger means smoothly to rest at the end of the delivery stroke, a helix upon the plunger which upon rotation varies the quantity of fuel injected, a helix upon the dashpot means which upon rotation varies the point in the delivery stroke at which the dashpot action commences and means for rotating them in co-ordination simultaneously, liquid flow control means between said injection pump means and said accumulator means for controlling the supply of pressure liquid to the injection pump means comprising a cylinder, a discharge pipe, port means in the walls of the cylinder communicating respectively with the accumulator means, the plunger means and the discharge pipe, and a piston in the cylinder adapted to open and close the ports and place the plunger means in communication alternatively with the accumulator means and the discharge pipe, and operating means for operating the liquid flow control means in timed sequence with the cycle of operation of the engine.

5. Liquid fuel injection system for an internal combustion engine comprising storage means for liquid, a variable delivery pump for delivering liquid under pressure from said storage means, accumulator means for receiving the pressure liquid from said pump comprising a sealed vessel defining a chamber containing a gaseous medium which is separated from a chamber containing the said pressure liquid by a diaphragm, the pressure of the gas being relatively constant but varying with the quantity of fuel injected by the system and independent of all other operations of the engine, liquid pressure operated injection pump means having plunger means and dashpot means associated therewith adapted to bring the plunger means smoothly to rest at the end of the delivery stroke, a helix upon the plunger which upon rotation varies the quantity of fuel injected, a helix upon the dashpot means which upon rotation varies the point in the delivery stroke at which the dashpot action commences and means for rotating them in co-ordination simultaneously, liquid flow control means between said injection pump means and said accumulator means for controlling the supply of pressure liquid to the injection pump means comprising a cylinder, a discharge pipe, port means in the walls of the cylinder communicating respectively with the accumulator means, the plunger means and the discharge pipe, and a piston in the cylinder adapted to open and close the ports and place the plunger means in communication alternatively with the accumulator means and the discharge pipe, and operating means for operating the liquid flow control means in timed sequence with the cycle of operation of the engine.

References Cited in the file of this patent

UNITED STATES PATENTS

| | | |
|---|---|---|
| 1,816,157 | Scott | July 28, 1931 |
| 1,956,612 | Brun | May 1, 1934 |
| 2,598,528 | French | May 27, 1952 |

FOREIGN PATENTS

| | | |
|---|---|---|
| 192,691 | Great Britain | Feb. 28, 1924 |
| 441,872 | Great Britain | Jan. 27, 1936 |
| 53,524 | Denmark | Aug. 30, 1937 |

UNITED STATES PATENT OFFICE
CERTIFICATE OF CORRECTION

Patent No. 2,803,234                                                       August 20, 1957

Wilfred Percival Mansfield et al.

It is hereby certified that error appears in the above numbered patent requiring correction and that the said Letters Patent should read as corrected below.

In the grant, lines 2 and 3, and lines 13 and 14, also in the heading to the printed specification, lines 6 and 7, name of assignee, for "The British International Combustion Engine Research Association", each occurrence, read -- The British Internal Combustion Engine Research Association --.

Signed and sealed this 24th day of December 1957.

(SEAL)
Attest:

KARL H. AXLINE
Attesting Officer

ROBERT C. WATSON
                                                                             Commissioner of Patents